United States Patent
Feller

(10) Patent No.: US 6,298,326 B1
(45) Date of Patent: Oct. 2, 2001

(54) OFF-SITE DATA ENTRY SYSTEM

(76) Inventor: Alan Feller, 287 Northern Blvd., Suite 200, Great Neck, NY (US) 11021

(*) Notice: Subject to any disclaimer, the term of this patent is extended or adjusted under 35 U.S.C. 154(b) by 0 days.

(21) Appl. No.: 09/311,373

(22) Filed: May 13, 1999

(51) Int. Cl.[7] .......................... H04M 11/10; G10L 21/06
(52) U.S. Cl. ............................... 704/270; 369/25; 379/75
(58) Field of Search .................................. 704/235, 270; 369/25; 375/75

(56) References Cited

U.S. PATENT DOCUMENTS

| | | | |
|---|---|---|---|
| 5,008,871 | * 4/1991 | Howells et al. | 369/28 |
| 5,051,924 | 9/1991 | Bergeron | 364/513 |
| 5,146,439 | 9/1992 | Jachmann | 369/25 |
| 5,179,627 | 1/1993 | Sweet | 395/2 |
| 5,265,075 | 11/1993 | Bergeron | 369/25 |
| 5,475,798 | 12/1995 | Handlos | 395/2 |
| 5,799,273 | * 8/1998 | Mitchell et al. | 704/235 |
| 5,809,464 | 9/1998 | Kopp | 704/235 |
| 5,812,882 | 9/1998 | Raji | 395/892 |
| 5,828,730 | 10/1998 | Zebryk | 379/88 |
| 5,875,436 | 2/1999 | Kikinis | 705/34 |
| 5,875,448 | 2/1999 | Boys | 707/531 |
| 5,960,447 | * 9/1999 | Holt et al. | 707/500 |
| 6,122,614 | * 9/2000 | Kahn et al. | 704/235 |
| 6,175,822 | * 1/2001 | Jones | 704/270 |

* cited by examiner

*Primary Examiner*—Tālivaldis Ivars Šmits

(57) ABSTRACT

An off-site data entry system comprises a computer device located at a dictation station, the computer device comprising a means to accept voice dictation from a user. The device further comprises a converter means which functions to convert the voice dictation from analog to digital status, a means to compress the voice dictation, and a means to pass the digital representation of the voice dictation to a plurality of memory registers. The system also comprises a means to telephonically transmit the voice dictation to a transcription station, the transcription station that includes at least one human transcriptionist. The system then routes the voice dictation to an available transcriptionist who has the ability to buffer the voice dictation, wherein the digital representation of the dictation is addressed by software, which allows such to be delayed, rewound, and advanced while simultaneously receiving and storing additional real-time voice dictation. The transcriptionist listens to the voice dictation through usage of an audio output device and types the dictation information into a computer device. The system then includes a means to telephonically transmit the typed text transcription back to the user giving dictation, as well as a means to instantly display the transcription on a monitor at the computer device of the user giving dictation functioning to create a system whereby the user speaks into the computer device and views spoken words on the monitor while speaking. Finally, the system provides a means for the user giving voice dictation to print the typed text transcription on any document including those bearing previously printed information.

24 Claims, 4 Drawing Sheets

Overall System

1. User Terminal - ie., PC, Laptop, Phone, Custom system, Network
2. Data Entry Node - Transcription House, Billing House
3. Data Entry Node
4. Inter Nodal Link - Data & Voice

OFF-SITE DATA ENTRY SYSTEM

BACKGROUND OF THE INVENTION

1. Field of the Invention

The present invention is an off-site data entry system. More particularly, the present invention is a system that allows a user to dictate into a computer device and see the dictated words appear on a monitors as they are spoken in a substantially real-time manner. The user may then edit, digitally store, or print the document instantly.

2. Description of the Prior Art

Numerous innovations for advanced data entry systems have been provided in the prior art that are described as follows. Even though these innovations may be suitable for the specific individual purposes to which they address, they differ from the present invention as hereinafter contrasted. The following is a summary of those prior art patents most relevant to the invention at hands as well a description outlining the differences between the features of the present invention and those of the prior art.

U.S. Pat. No. 5,875,436, invented by Kikinis, titled "Virtual transcription system"

In the patent to Kikinis, a computerized transcription system is based on a transcribe server that receives voice messages over long distance links, assigns jobs to technicians at remote locations, sends voice tiles to and receives transcribed work from the technicians, forwards transcribed copies to instructed and preprogrammed destinations, informs subscribers of completion, and calculates and forwards accounting to subscribers. In extended aspects the system comprises multiple such servers networked together. Technicians at remote locations are paged in a preferred embodiment, and have an option to accept or decline a job. Upon acceptance the work is transmitted. Upon completion technicians return transcribed versions of jobs to the transcribe server, where forwarding is accomplished based on preprogrammed and attached instructions.

U.S. Pat. No. 5,146,439, invented by Jachmann, et. al., titled "Records management system having dictation/transcription capability"

The patent to Jachmann describes an integrated records management system having the capability to record and transcribe dictation. The system is particularly useful for the prompt and efficient management of patient's medical records. The system includes a digital dictation sub-system with a number of dictation input units and a number of transcription output units. The dictation system receives dictation jobs corresponding to reports, and particularly medical reports and stores them as voice files for later output for review of transcription. Job records containing information about the dictation jobs is transmitted to a database server which manages and maintains a database of medical records. The transcription output terminals together with word processing stations connected to the data base server form work stations for transcriptionist. When a dictation job is to be transcribed the database manager combines information in the database with a selected form for the identified report type prior to transcription and when the dictation job is transcribed into that format to form a complete document representing a report, selected portions of that report may be extracted to form a summary report by the system database manager. The system also includes printers for output of reports a system administrator station, a communications link to other data processing systems and archival storage.

U.S. Pat. No. 5,179,627, invented by Sweet, et. al., titled "Digital dictation system"

The patent to Sweet describes a digitally implemented central dictation system wherein users designated as dictators may input Voice Files for later retrieval and transcription by a second group of users designated as transcriptionists. A system Supervisor has the capability to monitor operation of the system and allocate system resources. The system further includes an optional Voice Mail capability.

U.S. Pat. No. 5,265,075, invented by Bergeron, et. al., titled "Voice processing system with editable voice files"

In the patent to Bergeron, a central dictation system includes apparatus for prerecording standard voice files. Users of the system may select one of the prerecorded files. The selected file is copied to a new file, which the user is free to edit. The edited tile is assigned to a transcriptionist or is accessible to an authorized listener in the same manner as a conventional dictation job. The prerecorded standard files may contain, for example, standard radiology reports tailored to each user's preferences. Alternatively the recorded files may contain questions or prompts that guide users to dictate information required to complete preprinted report forms.

U.S. Pat. No. 5,812,882, invented by Raji, et. al., titled "Digital dictation system having a central station that includes component cards for interfacing to dictation stations and transcription stations and for processing and storing digitized dictation segments"

The patent to Raji describes a modular digital dictation system that can be easily modified to service a variable number of dictation stations and transcription stations. The modular digital dictation station comprises a central station for receiving digitized dictation signals from a network of dictation stations storing the voice portion of the digitized dictation signals as digitized dictation segments and routing the digitized dictation segments to a network of transcription stations. The central station includes a plurality of line interface and signal processing cards. The number of line interface and signal processing cards connected to the central station determines how many dictation stations and transcription stations the modular digital dictation station can service. The line interface cards may be removed from or connected to the central station during operations. A fast search program is provided to quickly find files containing desired digitized dictation segments stored in the central station. The fast search program uses arrays of identification numbers to quickly retrieve the files. The first array stores the address of the files in memory in the order in which the files are created. The second array stores identification numbers corresponding to each file in the order in which the tiles are created. The structure of the second array facilitates quickly finding an identification number. The position of the identification in the second array corresponds to a location in the first array containing the address in the file in memory. The position of the identification number in the second array is therefore used to calculate the location of the file in memory.

U.S. Pat. No. 5,875,448, invented by Boys, et. al., titled "Data stream editing system including a hand-held voice-editing apparatus having a position-finding enunciator"

In the patent to Boys, an audio editor operates with files capable of storing text and voice data in separate regions, and provides functions for entering data as voice data, and also for fully editing the entered voice data. Files can be uploaded from the Audio Editor to a PC application for converting the file entirely to text, providing a system wherein all variable entry and editing can be done verbally, and conversion to text left as a final chore. In an alternative embodiment the Audio Editor is implemented as a PC application wherein a user can enter and fully edit variable input as voice and then communicate the resulting file to another for final conversion. In yet another embodiment the Audio Editor is implemented as additional functionality to a high-end word processor application. In further embodiments computerized natural data editors are provided for reviewing and editing natural data streams of all sorts, such as video streams, musical works, and the like.

U.S. Pat. No. 5,475,798, invented by Handlos, titled "Speech-to-text translator"

The patent to Handlos describes a device for assisting communication that comprises a generally rectangular enclosure of a size constructed and adapted to be held in a user's hand. A microphone is positioned within the enclosure for receiving, speech acoustics and converting such acoustics into corresponding electrical signals. Information correlating speech with alphanumeric text is prestored in electronic memory positioned within the enclosure, and the speech signals received from the microphone are correlated with corresponding text in memory. A liquid crystal display (LCD) on one wall of the enclosure displays the alphanumeric text to the user substantially in real time.

U.S. Pat. No. 5,051,924, invented by Bergeron, et. al., titled "Method and apparatus for the generation of reports"

The patent to Bergeron describes a method and apparatus for generating, and storing for later retrieval, selected voice messages in response to selected verbal input trigger phrases. The voice signals including predetermined trigger phrases are transmitted from an input device such as a multiline telephone to a voice recognition system. The voice recognition system associates the trigger phrases with predetermined blocks of text message and in response to a sequence of trigger phrases, creates a report. The text is then output to a voice synthesizer system for the creation of synthetic voice signals corresponding to the full text of the report and the synthetic voice signals are output to a voice storage and forward system for later retrieval. The system also provides a printed copy of the full text of the report. In one embodiment of the system, an exception dictionary is provided which substitutes replacement words having a modified spelling for exception words whose pronunciation as synthesized by the voice synthesizer is not considered acceptable.

U.S. Pat. No. 5,809,464, invented by Kopp, et. al., titled "Apparatus for recording speech for subsequent text generation"

In the patent to Kopp, an apparatus for recording speech for subsequent generation of a text includes an acoustic input (M) and an acoustic output (L) for inputting and outputting analog speech respectively. An analog-to-digital/digital-to-analog (AD)/DA) converter converts the inputted analog speech into a digitized speech and converts digitized speech into analog speech. A preprocessor (VV) preprocesses the digitized speech converted by the converter (AD/DA), and extracts spectral component characteristics from the digitized speech. A digital memory (MEM) stores the digitized preprocessed speech and a controller (CON) controls an execution of inputted operating functions by at least one of the preprocessor and the digital memory. The method of recording speech for subsequent generation of a text using a speech-processing system includes digitizing an input analog speech data, preprocessing the digitized analog speech data by extracting spectral component characteristics from the digitized analog speech for subsequent generation of a text by a speech recognition process storing the digitized preprocessed speech in a digital memory, and subsequently retrieving the digitized preprocessed analog speech from the digital memory and converting the retrieved speech into a text by use of a speech-process, system that includes a speech recognition program.

U.S. Pat. No. 5,828,730, invented by Zebryk, et. al., titled "Method and apparatus for recording and managing communications for transcription"

The patent to Zebryk describes a server located at a first location for recording and managing communications for transcription generated at a second location. Clients contact the server to store communications for transcription. The client is given the option to create a user configurable profile that defines user identification data and recording options for that client. The user identification data includes a user identification number and an audible user identification which is associated with each user identification number. The communications are recorded based on the recording options in the user configurable profile. Exemplary recording options include file integrity and audio archiving. The server also provides the user with the ability to withhold a recording for completion at a later time.

As outlined above most additional prior art patents that relate to advanced dictation systems largely entail elements such as: an integrated records management system; systems with optional voice mail capability; systems relying upon the usage of prerecorded standard files; hand-held and portable voice recognition devices, and an apparatus for generating and storing for later retrieval selected voice messages in response to selected verbal input trigger phrases.

In addition, it is well adopted in the prior art that transcription houses contain multiple incoming telephone lines connected to a bank of recording devices, such as tape recorders or solid state digital storage systems. After a recording is completed, the tape or digital data is delivered to a typist who begins transcription. The recorded voice is heard using a standard tape player with rewind and pause features, usually controlled by a toot pedal. The typing is typically done on a desktop personal computer, which may or may not be networked with other devices. The final document is stored to disk and the document is copied on a standard printer. A blank piece of paper is often utilized for each dictation taken. The final document is then transferred via mail, e-mail fax, or delivery. In such instances, the turnaround time from dictation to delivery is usually 24–72 hours. Should the dictator need to edit document, the turnaround time often approaches one week.

Furthermore, standard transcription technology usually calls for a series of actions which make it impractical for many office settings. For example, a busy medical practice could benefit greatly from transcription, but many do not use such systems due to the fact that turnaround times are so long that one can not properly edit the document when it is returned. That is to say, if the time it takes between saying the word and seeing it on the screen is longer that several seconds, the technology is far less valuable. Moreover since it is difficult for the doctor to remember details of an individual patient at a far later time, there is significant potential of malpractice and liability.

With regards to such current systems, U.S. Pat. No. 5,875,4366 invented by Kikinis, represents the closest prior art patent to the present invention. The Kikinis patent claims a computerized transcription system based on a server that receives voice messages over telephone lines, assigns jobs to technicians at remote locations, and sends voice files to and receives transcribed work from the technicians.

However, the Kikinis patent relies on a system wherein the transcriber sends the document back to the user via fax, e-mail, or overnight courier. As such, the Kikinis patent fails to teach the usage of the real-time transcription delivery system as featured by the present invention. Accordingly, the present invention is far more beneficial to users in the medical profession, and other professions, where real-time document delivery is of the utmost importance.

Indeed, in contrast to all above-described patented devices the present invention provides a system for simultaneous transfer of raw voice in one direction and useful electronic data in the other. Thus, it allows a user to dictate into a device and see the words appear on a monitor as they are spoken. The present invention further allows a user to then edit, digitally store, or print the document instantly.

Accordingly, with the present system, the user has instant turnaround and edit time. For example, once a doctor using the system is finished with a patient chart and says "print", he can put it out of his mind, knowing the transcription is correct and not having to review the patient chart again until the next patient visit.

SUMMARY OF THE INVENTION

The information age has seen tremendous progress with the advent of the personal computer, allowing one to send, edit, store, manipulate, and print data at an incredible rate. However, even with such complex machinery, one still must manually enter original data into such systems. It is this human-to-machine interface that represents the most significant bottleneck in the flow of information. The present invention, however makes the best of the present situation. It allows a user to speak into a machine and see his words come out typed on a screen while still speaking. This allows him to "edit on the fly" and make corrections and changes in real time without ever touching a keyboard or being familiar with same. He can say "print" or "store" or "transfer to my office" and such is performed and fully available immediately.

To accomplish the foregoing, as previously noted, the system utilizes advanced telecommunications methods combined with a central office of human transcribers. When a user activates the system, a telephone call is made to a central office and routed to a transcriber. Once the connection is made, the user is queued to begin his dictation. The user begins dictation and the voice is digitized, compressed and sent telephonically down "one side" of the telephone line.

More specifically, the voice is converted from analog to digital status, and the digital representation is passed to memory registers and addressed by software in such a way that it can be delayed, rewound, and fast forwarded, by a solid state buffer. Integral to the effectiveness of the system is that such takes place while simultaneously receiving and storing real-time dictation. Importantly, this is designed to ensure accurate transcription.

Then the conditioned data is played out through a digital to analog converter at the "other side" and presented to the transcriber, who immediately begins to type. When the transcriber begins to type, the data is compressed, sent back to the user, and appears on user's monitor.

As noted above, when the user is finished reading what he dictated, all he need do is place the paper he wants the document printed on into the printer and say "print document."

Thus, the system effectively provides a typist at the disposal of one giving dictation, at only the cost of time actually spent during dictation and transcription, without any down time. To the user, the system is a simple to operate tool that seamlessly converts words to digitized text. However, unlike "voice digitized technology" systems, the system of the present invention is actually a combination of technologies that includes advanced telecommunications and a central office of human transcribers and typists.

In total, the novel features which are considered characteristic for the invention are set forth in the appended claims. The invention itself however, both as to its construction and its method of operation together with additional objects and advantages thereof, will be best understood from the following description of the embodiments when read and understood in connection with accompanying drawings.

DETAILED DESCRIPTION OF THE PREFERRED EMBODIMENT

Figure 1:
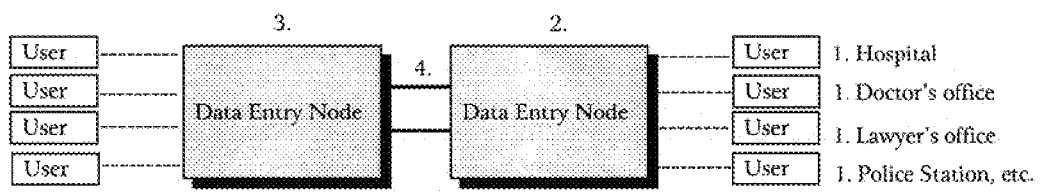
FIG. 1 is a flowchart of the overall system of the present invention.
Figure 2:
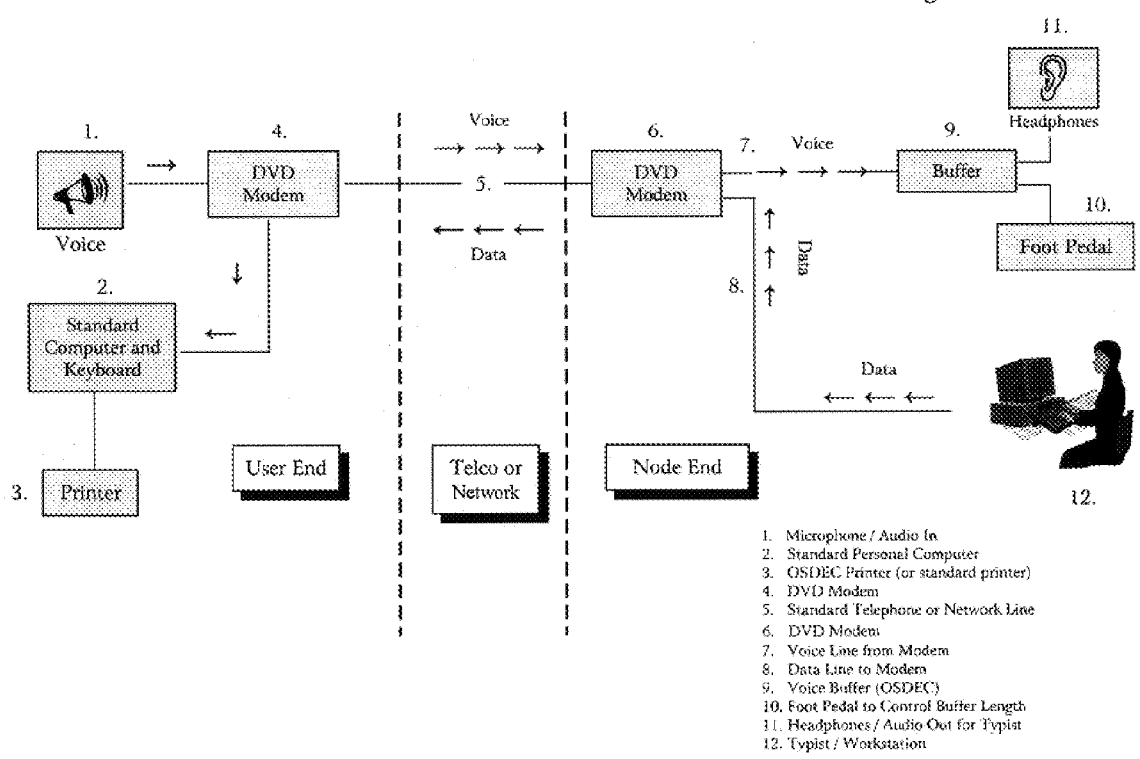
FIG. 2 is a detailed flowchart of the schematic of the system, illustrating the path and means by which information is sent and received.
Figure 3:
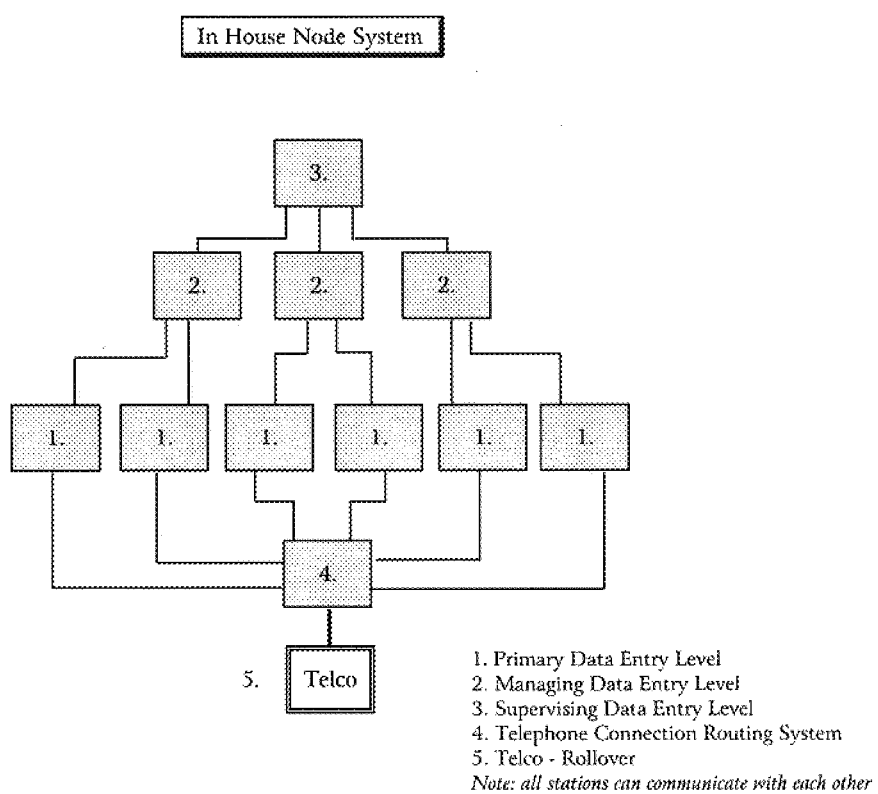
FIG. 3 is a flowchart of the in-house node system utilized by the present invention, in the preferred mode.
Figure 4:
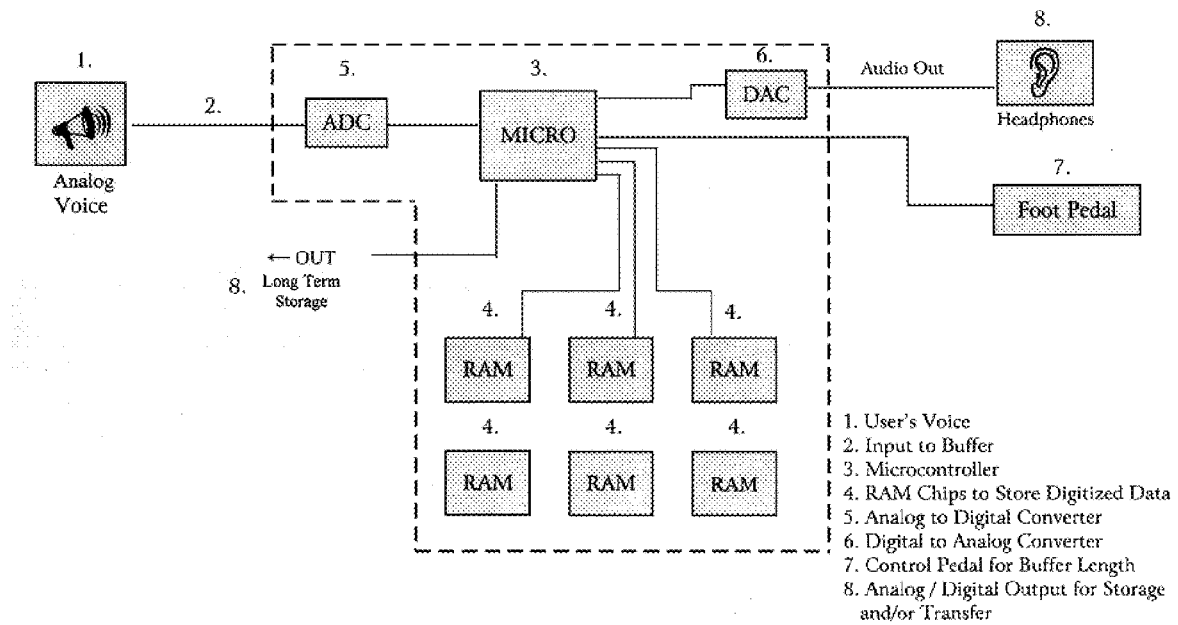
FIG. 4 is a flowchart of the buffer means utilized by the present invention, in the preferred mode.

For the purposes of example, the following description of the preferred mode of the present invention follows the route of information between a doctor in a hospital or medical office and a transcriptionist on the other end of the system's telephone line. "According to such example, FIG. 1 is a flowchart of the overall system of the present invention; FIG. 2 is a detailed flowchart of the schematic of the system, illustrating the path and means by which information is sent and received; FIG. 3 is a flowchart of the in-house node system utilized by the present invention, in the preferred mode; FIG. 4 is a flowchart of the buffer means utilized by the present invention, in the preferred mode."

First, the doctor approaches the system terminal, which may be sitting on a standard nursing station. The doctor powers up a computer device and simply clicks an icon to start the program's in the preferred mode. Importantly, specialized software is written and utilized to keep the system's primary terminal in an idle mode ready to be used. Then, in the preferred mode the doctor hits one button on the screen and a macro begins. This activates a local voice buffer that allows the doctor to begin speaking into the system immediately. It should be noted that the local voice buffer is activated while the terminal modem calls the transcription office, in an effort to achieve the utmost in efficiency. The user then identifies himself and provides an account number to access the system.

While the user is doing so, the computer links to a transcription node, or office operated by the system. In the preferred mode, a DSVD-type modem links the local terminal and the transcriptionist office together. This modem allows for the simultaneous passing of voice and electronic data, also utilized to maximize system efficiency in a tremendously busy office setting. This is the manner in which voice information can be sent to the transcriptionist in one direction, and electronic data from the transcriptionist's terminal can be sent in the other direction at the same time. By utilizing such type of link, the doctor and transcriptionist are virtually in the same room as one another, creating a unique system whereby the inherent advantages of human transcription services are greatly relied upon.

By utilizing this mechanism, the doctor effectively need not wait while the connection is made, but instead may begin dictation instantly. After only a few moments, as the doctor is continuing his dictation, his first sentences appear on the screen, allowing for sufficient time to proofread and edit as the doctor is speaking.

After the connection is made, the user terminal "dumps" the raw audio data within the local buffer "down" the telephone line into a waiting buffer means, comprises within the transcriptionist's computer device.

Once the user account number is recognized and accepted by the system, the transcriptionist opens the appropriate file in the computer device and is thus ready to begin typing. Using advanced buffering, equipment, the transcriptionist types at a comfortable speed while the doctor continues to dictate at speed with which the doctor is completely comfortable, or a speed required by the urgency of the medical situation. As previously noted, the simultaneous transmission of voice information from the doctor and electronic data from the transcriptionist is performed in the preferred mode by digital simultaneous voice and data modems, or other such means.

More specifically, as the doctor speaks, the voice is digitized and sent down the telephone line where it is received and buffered for a period of time, determined by a foot pedal used by the transcriptionist in the preferred mode of operation. If the doctor is speaking too quickly for the transcriptionist, the transcriptionist simply releases the pedal and the buffer begins to fill. Pressing such pedal effectively allows the buffer to dispense information, functioning to allow the transcriptionist to resume typing moments later at a point where the transcriptionist has previously left off. This will maximize the efficiency of verbal information transfer between the persons and allow the transcription to proceed in the fastest, most reliable manner possible.

In all instances, should the typist not understand a word or phrase, the voice and text can be sent to a more experienced typist the next level up while dictation is still in progress. If the word or phrase is understood by the second typist, it is transcribed from the second typists station and is immediately inserted into the document without bothering the dictator or primary typist. This division of labor dramatically increases efficiency and accuracy while decreasing transcription time.

When the doctor is finished dictating, the doctor may proofread the lines that appear on the screen. Within moments, the last lines appear and the doctor commences to dictate edit changes, if required.

In the preferred mode, the transcriber then completely empties the buffer and executes a spell check function and edit protocol function on the entire document created.

The transcriber then listens for any further edit requests that may develop and performs them promptly. Once satisfied with such changes, the doctor may utter at least one verbal command to accomplish a variety of purposes.

The transcriptionist hears the request and routes the transcription to the doctor's office computer device. Then, the transcriptionist sends the typed text transcription as requested by the doctor. The speaker may opt for such to be stored on disk at a remote location which can be performed by the transcriber. He may then simply say "print" and all the transcriber need do is hit a button to send it to the printer sitting right next to the speaker.

The doctor may place the sheet of paper that he would normally handwrite the patient note on into the system's printer. If the document to be transcribed is a letter, then placing a fresh piece of paper into the printer and saying "print" is appropriate.

However, it should be noted that a common problem associated with standard dictation methods is the tremendous waste of paper. One problem is that typical dictation is only a paragraph long, leading to waste of an entire sheet of paper. For example, if a patient visited a doctor three times in one month, the doctor would wind up with three full pieces of paper in the patient chart for each transcription, because it would be impossible for the second and third transcription to be appended first. Hence, the size of a patient chart may become prohibitive should the patient return multiple times, generating dozens of sheets of paper where one or two would suffice.

With the present system, then, the printer may scan the patient's last page of the chart and will automatically print the current transcription just below the end of the last entry. This way only one page is utilized. To accomplish this, a standard printer is modified with a low end, low resolution scanner where paper is entered. As the paper is advanced, it is scanned and optical recognition software will determine where the last line of printed text was placed. The computer will then advance the printer to this point and begin printing the current transcription. It is important to note that such a system functions in the same manner whether the final entries are printed or handwritten.

The doctor then signs off and, in the preferred mode, the system displays the amount of time used and charges the doctor's account accordingly. The system may then automatically bill the doctor's account for added convenience in full operation of the system.

Having completed the transcribing task, the transcriber is given a rest for a certain period of time and is then made available for a subsequent dictation by the next system user. The doctor may then sign the printed transcription and move on to the next patient.

It should be noted that the core of the system is data entry, and specifically transcription. However, the system is also designed as a platform for data exchange, storage, scanning, printing, manipulating, duplicating and more. The system will allow for communication between users and for advertising.

With regards to all FIGURES, while the invention has been illustrated and described as embodied, it is not intended to be limited to the details shown, since it will be understood that various omissions, modifications, substitutions and changes in the forms and details of the device illustrated and in its operation can be made by those skilled in the art without departing in any way from the spirit of the invention.

Without further analysis, the foregoing will so fully reveal the gist of the present invention that others can readily adapt it for various applications without omitting features that, from the standpoint of prior art, constitute essential characteristics of the generic or specific aspects of this invention. What is claimed as news and desired to be protected by Letters Patent is set forth in the appended claims.

I claim:

1. An off-site data entry system comprising:
   a) a computer device located at a dictation station, the computer device comprising a means to accept voice dictation from a user, and further comprising:
   b) a converter means functioning to convert said voice dictation from analog to digital status;
   c) a means to compress said voice dictation creating a compressed digital representation of said voice dictation;

d) a means to pass the digital representation of said voice dictation to a plurality of memory registers;

e) a means to telephonically transmit the digital representation of said voice dictation to a transcription station, the transcription station comprising at least one human transcriptionist therein;

f) a means to route the digital representation of said voice dictation to an available transcriptionist;

g) a means to for the transcriptionist to buffer the digital representation of said voice dictation, wherein the digital representation of said voice dictation is addressed by specialized software, said software functioning to allow the digital representation of the voice dictation to be delayed, rewound, and advanced while simultaneously receiving and storing additional real-time voice dictation;

h) an available transcriptionist listening to said voice dictation through usage of an audio output device;

i) said transcriptionist typing voice dictation information into a computer device;

j) a means to telephonically transmit typed text transcription back to the user giving dictation;

k) a means to instantly display the typed text transcription on a monitor at the computer device of the user giving dictation, functioning to create a system whereby the user speaks into the computer device and views spoken words on said monitor while speaking; and l) a means for the user giving voice dictation to print the typed text transcription.

2. The off-site data entry system as described in claim 1, wherein the transmissions of voice dictation and text transcription are performed by digital simultaneous voice and data modems.

3. The off-site data entry system as described in claim 1, wherein the transmissions of voice dictation and text transcription are performed by combination sound card means and substantially high-speed modem means.

4. The off-site data entry system as described in claim 1, wherein the system functions as a network accessed by a means selected from the group consisting of standard networking, telephone lines, and the Internet.

5. The off-site data entry system as described in claim 1, wherein the user speaks into a portable computer device utilized to access the system.

6. The off-site data entry system as described in claim 1, wherein a user accesses the system by verbally providing an assigned account number.

7. The off-site data entry system as described in claim 1, wherein a local voice buffer of voice dictation is activated at the user end prior to and while the computer device telephonically connects to the transcription station.

8. The off-site data entry system as described in claim 1, wherein the buffer means is a solid state buffer.

9. The off-site data entry system as described in claim 1, wherein the voice dictation is delayed, spooled out, and reeled back in by the transcriptionist through the usage of a foot pedal device operated by the transcriptionist.

10. The off-site data entry system as described in claim 1, wherein the buffer length is variably controlled by the user.

11. The off-site data entry system as described in claim 1, wherein the system provides the user with real-time remote and local editing of voice dictation and typed text transcription documents.

12. The off-site data entry system as described in claim 1, wherein the transcriptionist listens to edit requests made by the user and performs said requests promptly.

13. The off-site data entry system as described in claim 1, wherein the transcriptionist executes spell check and edit protocol functions of the text transcription document.

14. The off-site data entry system as described in claim 1, wherein the system comprises a printer which functions to scan previously printed text, advance the printer to said location of final segment of previously printed text, and automatically print a typed text transcription substantially immediately below said previously printed text, allowing a greater quantity of text to appear on a single sheet of paper.

15. The off-site data entry system as described in claim 14, wherein said printer comprises a substantially low end and low resolution scanner located at a paper entry aperture.

16. The off-site data entry system as described in claim 14, wherein the system comprises optical recognition software which functions to determine the location of a final segment of previously printed text on a document inserted into the printer.

17. The off-site data entry system as described in claim 1, wherein the system provides a means for the user to store the voice dictation information and typed text transcription on a local device.

18. The off-site data entry system as described in claim 1, wherein the system provides a means for the user to send the voice dictation information and text transcription to a second remote location via a means selected from the group consisting of facsimile and electronic mail.

19. The off-site data entry system as described in claim 1, wherein the system comprises a means for a transcriptionist to transmit voice dictation and typed text transcription to a second transcriptionist.

20. The off-site data entry system as described in claim 1, wherein the system comprises a means for a transcriptionist to transmit voice dictation and typed text transcription to a second transcriptionist during user connection.

21. The off-site data entry system as described in claim 1, wherein the user signs off of the system and the monitor displays an amount of time spent on the system during a previous session and automatically charges fees associated with the system to a user account.

22. The off-site data entry system as described in claim 1, wherein specialized software functions to keep the system in a substantially idle mode and ready for a subsequent voice dictation.

23. The off-site data entry system as described in claim 1, wherein the system is utilized by users selected from the group consisting of hospitals, medical offices, legal offices, court rooms, government offices, financial institutions, educational institutions, insurance companies, and private corporate offices.

24. The off-site data entry system as described in claim 1, wherein the system is utilized for the generation and maintenance of medical patient charts.

\* \* \* \* \*